United States Patent [19]

Noro

[11] 3,962,774

[45] June 15, 1976

[54] METHOD OF INTERLOCKING A LATERAL MEMBER AND THE END OF A HOLLOW POST

[76] Inventor: Tadaomi Noro, 19-3 Tsurukawa 4 chome, Machida, Tokyo, Japan

[22] Filed: Mar. 19, 1975

[21] Appl. No.: 559,812

[52] U.S. Cl. .................. 29/432; 29/464; 29/526; 52/758 F; 256/22; 256/70; 403/264
[51] Int. Cl.² ........................ B23P 11/00
[58] Field of Search .............. 29/432, 464, 526; 256/22 X, 70; 403/407, 281, 264 X, 343, 282, 231; 52/758 A, 758 H, 758 FX

[56] References Cited
UNITED STATES PATENTS

| | | | |
|---|---|---|---|
| 1,599,068 | 9/1926 | Swope | 52/758 F UX |
| 2,524,443 | 10/1950 | Huffman | 403/281 X |
| 2,655,345 | 10/1953 | Lindman | 256/22 |
| 3,315,943 | 4/1967 | Van Den Broek | 256/22 |
| 3,317,227 | 5/1967 | Nijhuis | 403/231 |
| 3,394,518 | 7/1968 | Worrell | 403/231 X |
| 3,608,938 | 9/1971 | Murdock | 52/758 F |
| 3,695,649 | 10/1972 | Lavergne | 403/343 X |
| 3,781,973 | 1/1974 | Hubbard et al. | 29/526 |

Primary Examiner—Charlie T. Moon
Attorney, Agent, or Firm—Kurt Kelman

[57] ABSTRACT

Disclosed is a method of interlocking the rails of a railing, fence or the like with the ends of the hollow posts thereof. Also disclosed is the joint construction used with said method. The method and the joint construction make possible easy interlocking without the use of rivets, bolts and nuts, or welding and can be effectively applied to the assembling of tubular railings made from aluminum by extrusion molding. When the joint is to be provided between a post and a rail base which passes over or under one end of the post, a stud having a head is pushed through a hole provided in the rail base into the end of the hollow post and a self-tapping screw is threaded into a gap between the stud and the inner wall of the post to fix them. The shape of the stud head is made such that it dos not obstruct the threading of the self-tapping screw. When the joint is to be provided between a post and one end of a rail base which does not pass over or under the end of the post, a differently constructed stud having a lateral arm for holding the rail base is pushed into the end of the post and a self-tapping screw is driven into a gap between them.

3 Claims, 19 Drawing Figures

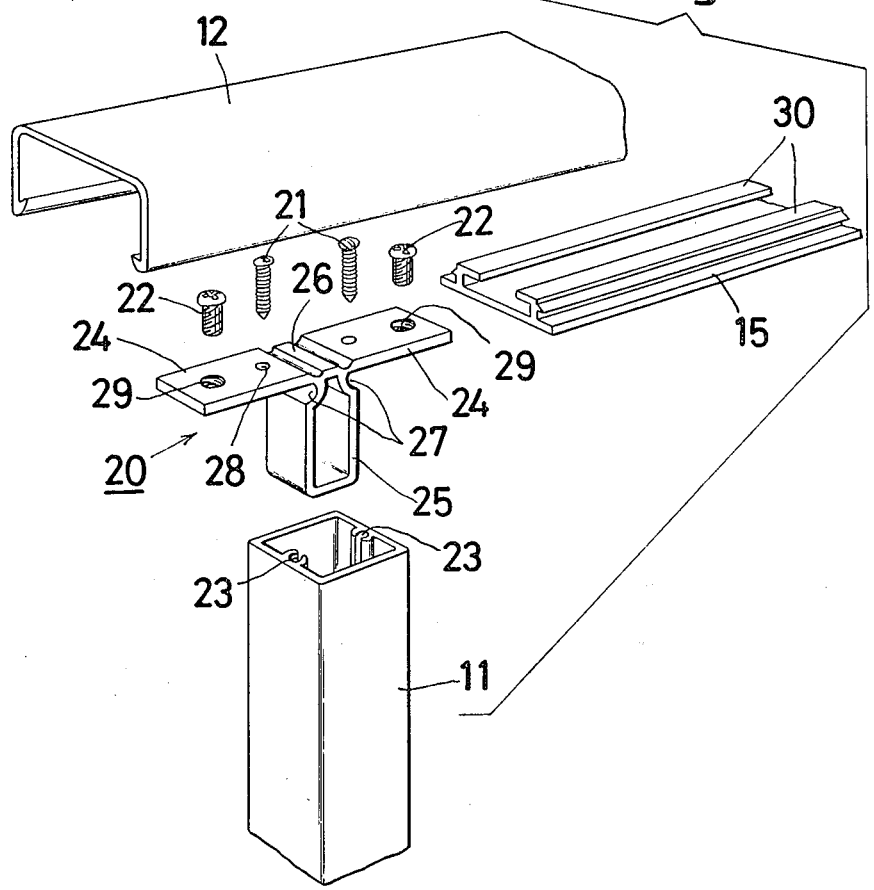
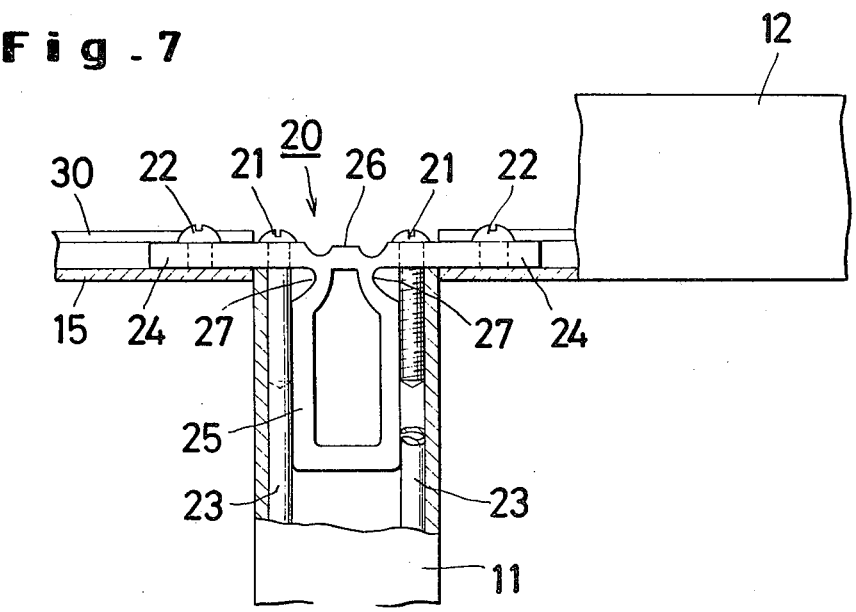

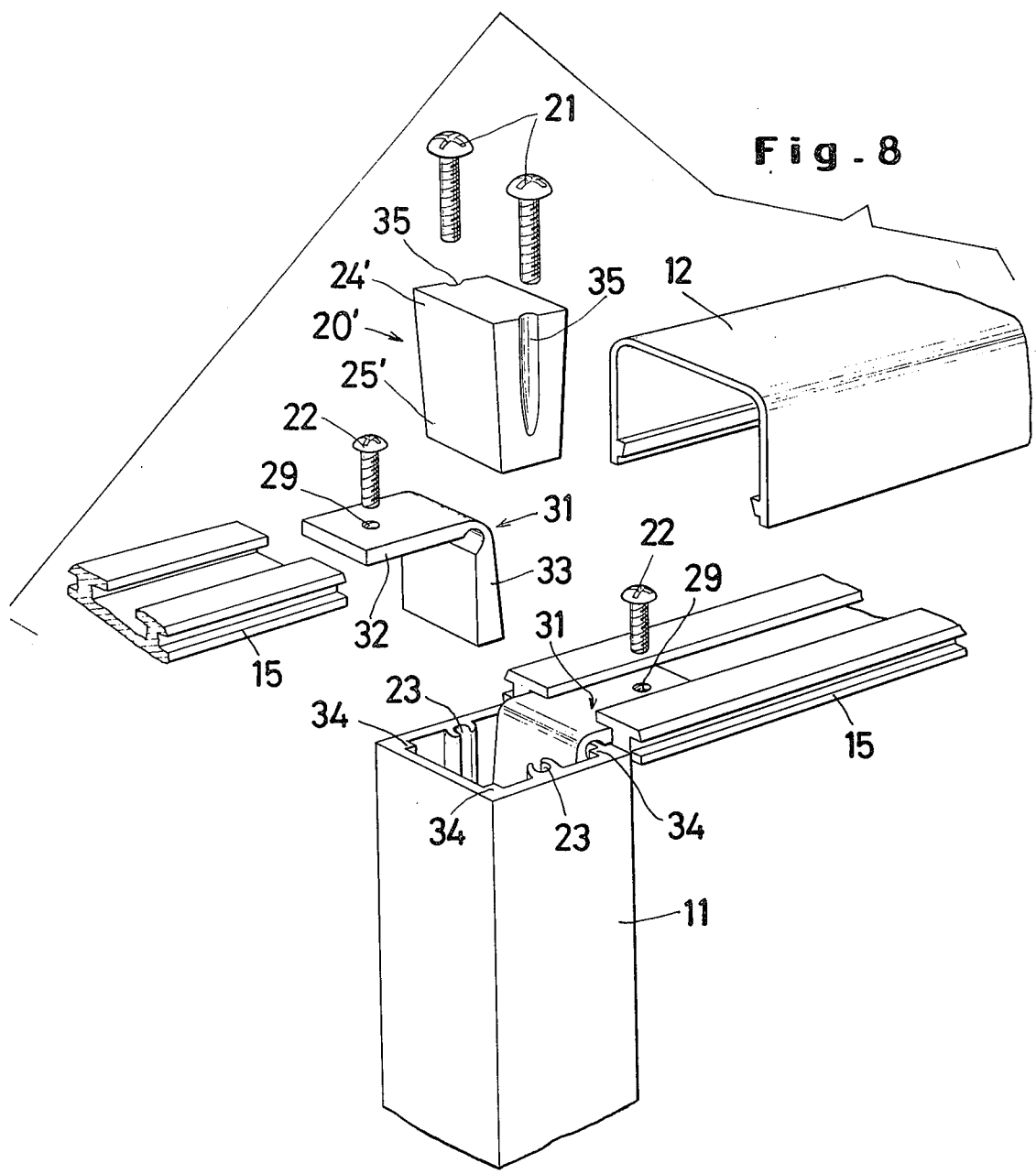

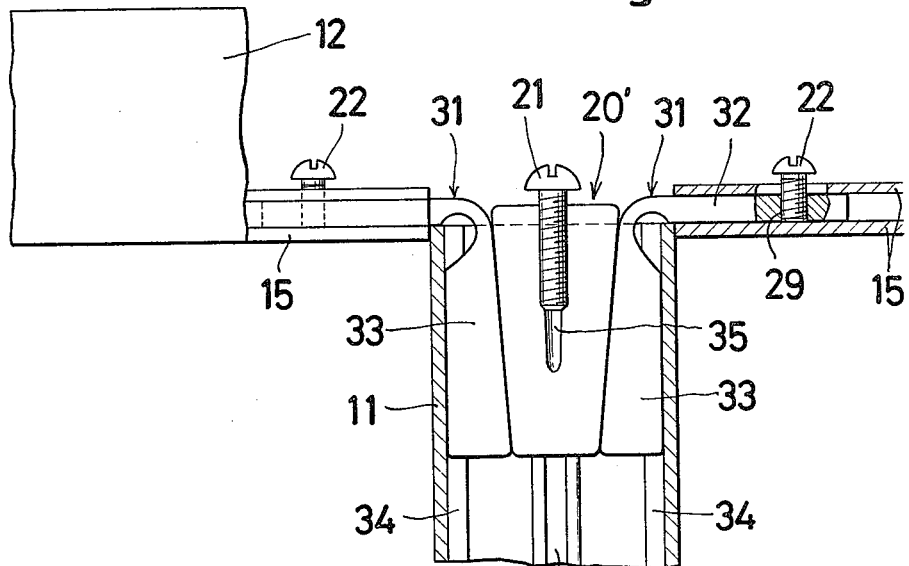
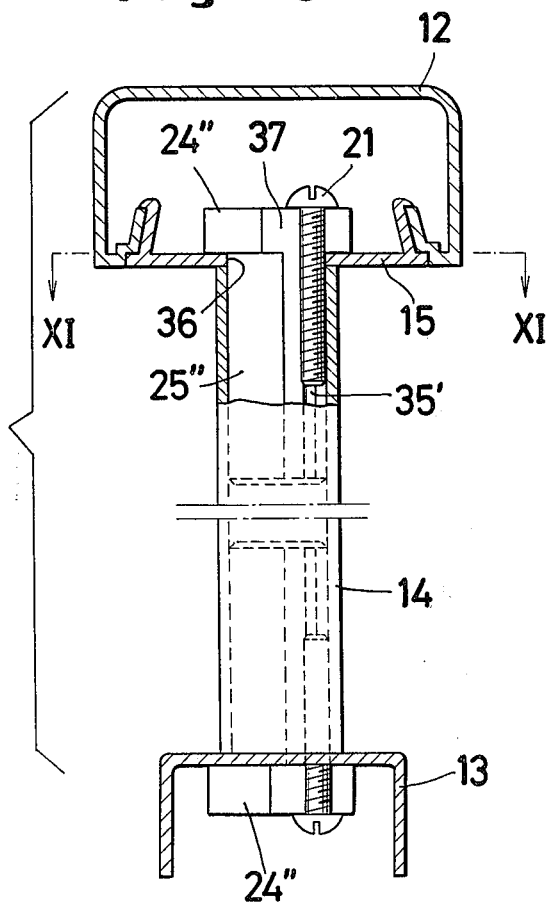
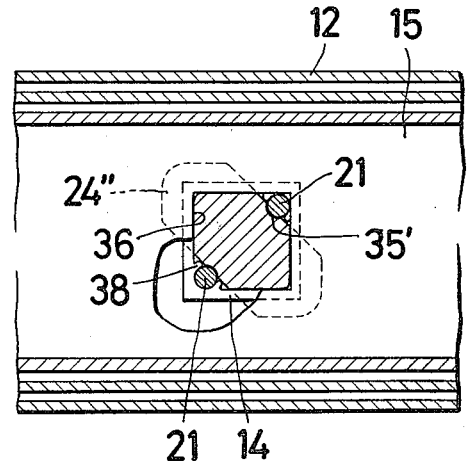

Fig _ 12
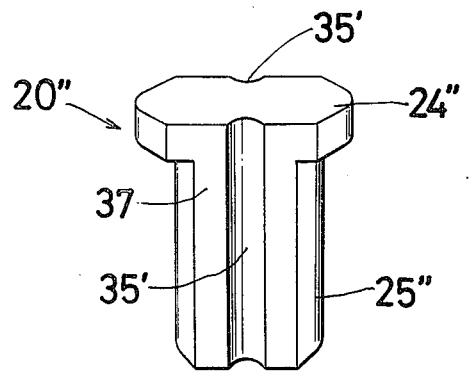
Fig _ 13
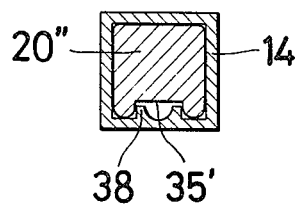
Fig _ 14
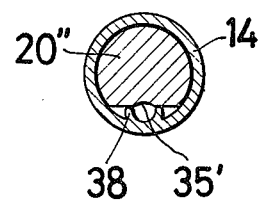
Fig _ 15
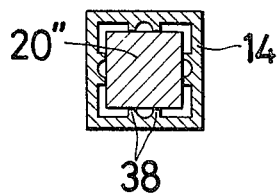
Fig _ 16
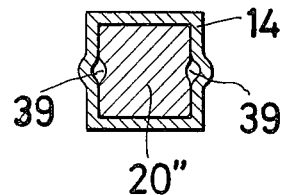
Fig _ 17
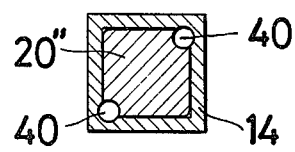
Fig _ 18
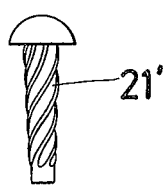
Fig _ 19
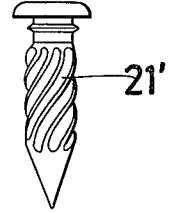

METHOD OF INTERLOCKING A LATERAL MEMBER AND THE END OF A HOLLOW POST

BACKGROUND OF THE INVENTION

The present invention relates to an improvement on an interlocking railing construction of the type disclosed in U.S. Pat. No. 3,498,589. More particularly, the present invention relates to a method of interlocking a lateral bar material and the end of a hollow post and the construction of the joint used to interlock said members.

Tubular railings made of aluminum by extrusion molding have recently gained wide use as stairway, balcony and enclosure handrails. The popularity of such railings stems from their good appearance, that fact that they do not require painting, the simplicity with which they can be assembled and the low cost at which they can be mass produced. In general, railings of this type are not assembled by bolt-nut jointing or welding but instead by insertion of wedges used to interlock separate members. Therefore, the railings can be assembled even by unskilled persons with the aid of only a hammer.

The interlocking force exerted by a wedge is greatly influenced by variations in size which are unavoidable with mass-produced parts. The influence of size variations is slight where the wedges are inserted until the insertion forces of the wedges become a predetermined constant value. Variations in force arise, however, in the interlocking of the rails and the hollow posts because the wedges must be inserted by a constant depth (and not until a certain force is produced) and the size of the wedges as well as the other parts is not uniform. Therefore, when a relatively small wedge is by chance inserted into a post having a relatively large center hole the force interlocking the members is corresponding small. As the joint is likely to weaken even further with the passage of time, the railing may well become a hazard to human life.

Accordingly, a first object of the present invention is to provide a simple and reliable method of fixing the joint portion between a lateral member such as a handrail and one end of a hollow post without using wedges, welding or bolts and nuts and further to provide a joint portion which uses a self-tapping screw as the fixing means both when the lateral member is mounted to pass over or under the hollow post and when the lateral member is fixed to the top or bottom of the post by one end thereof.

SUMMARY OF THE INVENTION

The present invention relates to a method of interlocking a lateral member such as a handrail and one end of a hollow post and to the construction of the interlocking parts. The method can be applied to forming a joint between one end of a post and a lateral member which passes over or under the post or between the end of the post and one end of the lateral member. In either case, the present invention utilizes a stud having a head portion of suitable shape to hold the lateral member at a desired position and a body portion adapted to be hammered into the end of the hollow post. The body portion of the stud is of such shape and size as to fit snugly into the hollow post. After the stud is inserted into the end of the hollow post, a self-tapping screw is inserted into a gap between the inner wall and the stud body in the axial direction of the post, so that the stud body is fixed to the hollow post and the head portion of the stud holds the lateral member in a desired position.

The term "self-tapping screw" used in this specification is defined to include a nail of the type which rotates as it is driven, and by stating that "the stud fits snugly into the hollow post" it is meant that the stud within the post cannot be moved in directions other than the axial direction thereof.

DESCRIPTION OF THE DRAWINGS

FIG. 6 is an exploded perspective view of a joint portion used to connect a post and a rail according to the present invention;

FIG. 7 is a front view partially in cross section of the joint portion shown in FIG. 6 after assembly;

FIG. 8 is an exploded perspective view of another embodiment of the present joint portion;

FIG. 9 is a front view partially in cross section of the embodiment shown in FIG. 8 after assembly;

FIG. 10 is a front view partially in cross section of a joint portion used to connect the end of a vertical bar and upper and lower rails according to the present invention;

FIG. 11 is a cross-sectional view taken along line II—II in FIG. 10;

FIG. 12 is a perspective view of the stud used in the embodiment in FIG. 10;

FIGS. 13 to 17 are cross-sectional views of portions of hollow posts having various cross sections into which the stud have been inserted; and FIGS. 18 and 19 are front views of self-tapping screws according to the present invention.

DESCRIPTION OF THE PREFERRED EMBODIMENTS

FIGS. 1 to 5 are for explanation of the conventional assembly-type tubular aluminum railing. These figures correspond to FIGS. 1, 2, 4, 8 and 10 of U.S. Pat. No. 3,498,589.

Figure 1:
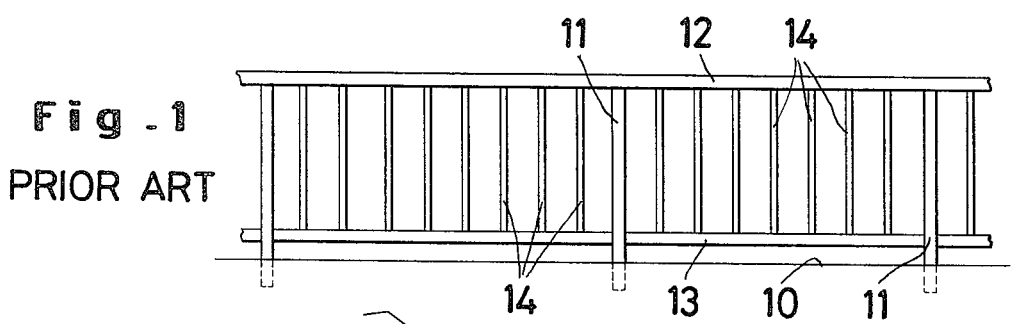
FIG. 1 is a front view of a tubular railing made of aluminum.

FIG. 1 shows an assembled railing consisting of a plurality of uniformly spaced upright hollow posts 11 which rest on a concrete floor 10, an upper rail 12 connecting the upper ends of the posts 11, bottom rails 13 connecting the lower portions of adjacent posts 11 and a number of vertical bars 14 connecting the upper rail 12 and the bottom rail 13.

Figure 2:
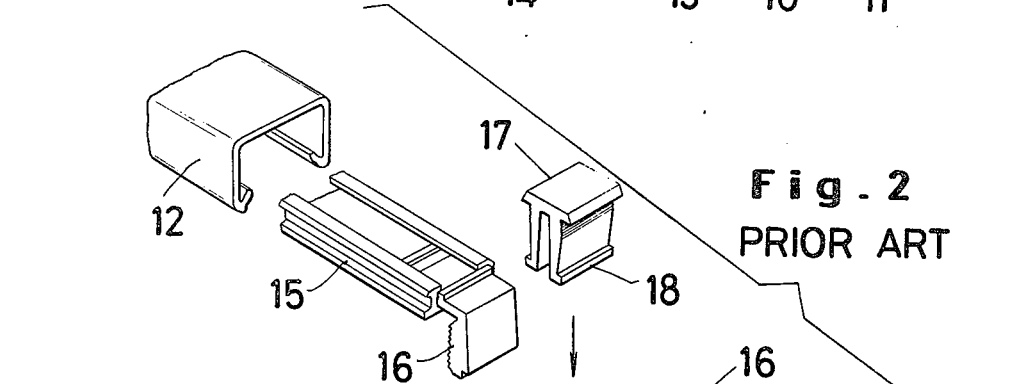
FIG. 2 is an exploded perspective view of the conventional joint portion used to join the end of a post with a rail base in the conventional aluminum railing.
Figure 3:
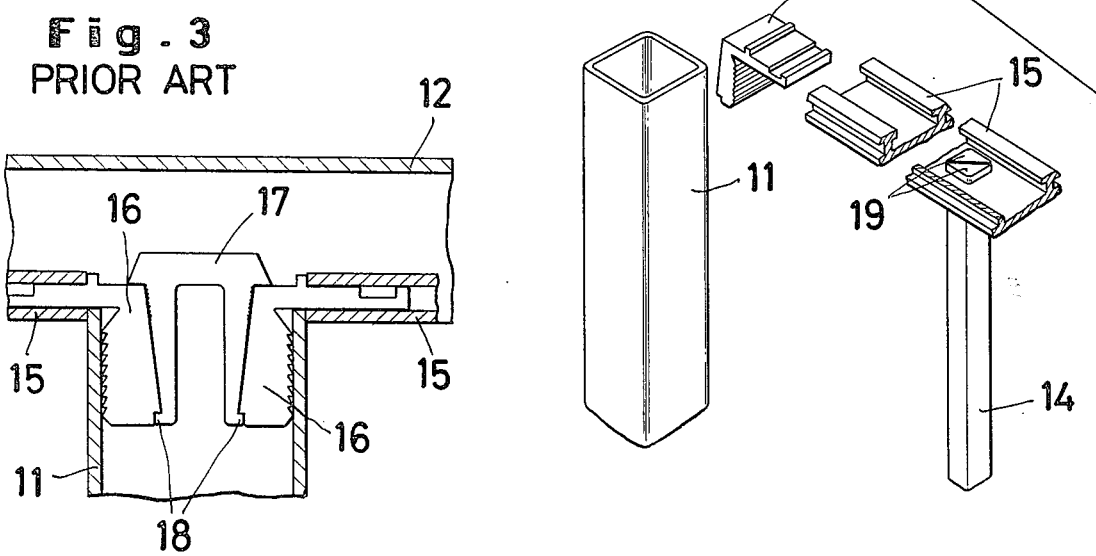
FIG. 3 is a partial cross section of the joint protion shown in FIG. 2.
Figure 4:
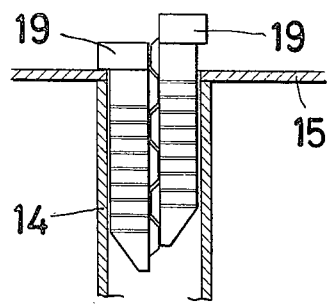
FIG. 4 is a partial cross section of the conventional railing showing the joint portion between the rail base and the end of the vertical bar prior to the insertion of a wedge.
Figure 5:
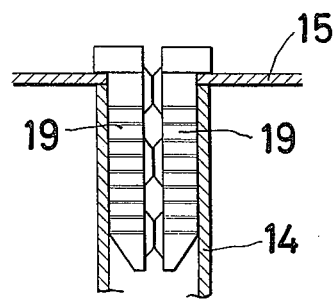
FIG. 5 is a similar view to FIG. 4 after insertion of the wedge.

The joint portions in question are those connecting the upper rail 12 to the end of the posts 11 and those connecting the rails 12 and 13 to the ends of the vertical bars 14. FIGS. 2 and 3 show a joint portion of the former and FIGS. 4 and 5 show a joint portion of the latter type.

The rail 12 is engaged resiliently with rail base 15 and is not connected directly to the post 11 or the bar 14.

The rail base 15 has a length corresponding to the interval between adjacent posts 11 and is connected at either end to the end of a post 11 via an intermediate member to be described. The rail 12 is merely placed on the rail bases 15 which have been mounted on the upper ends of the posts 11 and then pushed downwardly onto the rail bases 15 to engage resiliently therewith.

FIG. 2 shows an L-shaped hanger 16 which has been inserted into the end of a rail base 15. The hanger 16 serves as the above mentioned intermediate member. The vertical leg of the hanger 16 is inserted vertically into the upper end of the hollow post 11 on the left side thereof. In the same manner, the vertical leg of L-shaped hanger 16 is inserted into the same end of the same post on the right side thereof. A flexible, inverted U shape wedge 17 is inserted between the left and right hangers to assemble the joint in the manner shown in FIG. 3. By the insertion of the wedge 17, the hangers 16 are urged toward the opposite inner walls of the hollow post 11 to bring them into contact therewith and prevent them from coming loose. The wedge 17 itself is maintained in its position by the engagement of protrusions 18 provided at the lower ends of the wedge with notches in the lower ends of the hangers 16.

A disadvantage inherent to this construction is that the frictional engaging force between the hangers 16 and the inner surfaces of the post 11 becomes insufficient to prevent undesired movement of the rail bases 15, often because of variation in the size of the parts.

When the combination of mass-produced parts used to form the joint happens to include two relatively thin hangers 16, a relatively thin wedge 17 and a post 11 having relatively large inside dimentions, the hangers 16 and the wedge 17 can frequently be knoched out of the post by hitting the rail base 15 upwardly from the underside thereof.

The joint portion between rail base 15 and a vertical bar 14 (and that between a bottom rail 13 and a vertical bar 14) is usually formed by inserting a pair of wedges 19, only the head portions of which are shown in FIG. 2, into the vertical bar 14 as shown in FIG. 4 and FIG. 5. After partial insertion as shown in FIG. 4, the wedges 19 are driven into the vertical bar 14 with a hammer or the like until the land portions thereof mate as shown in FIG. 5 to thereby increase the frictional engaging force between the wedges 19 and the inner walls of the vertical bar 14. In this case, since the head portions of the wedges 19 abut the periphery of a hole provided in the rail 15 or the bottom rail 13, the resultant engagement will be complete if the above mentioned frictional force is strong enough. However, in case where the combination of the parts does not provide a snug fit the frictional force will be lowered. Further, even when the size relationship is proper, the relative position of the opposing wedges 19 in one post may be upset by the hammering of the wedges in another post during the assembly of the railing so that the frictional force will become insufficient. In addition, the frictional force produced by the resiliency of material generally decreases with the fatique of the material.

The present invention does not rely only on frictional force as does the conventional but uses a remarkably improved method employing screws. The use of screws ensures secure joints even when the size relationship among the parts is not wholly proper. In the present invention, the screws are used not perpendicular but parallel to the surface with which they engage. Therefore, the heads of the screws do not protrude and there is no need for nuts. Since, with this method, there is no concentration of stress at a specific point even when a large force is applied to the railing there is substantially no possibility of deformation of the hollow post.

First, a description will be given of the jointing method used when the lateral member does not pass over or under the end of the hollow post but is connected thereto by one of its ends. FIGS. 6 and 7 show a first embodiment of this type. As the left and right side rail bases are in mirror image relationship, the left side rail base has been omitted from FIG. 6. One important difference between this construction and that shown in FIGS. 2 and 3 is that the intermediate parts between the rail base 15 and the end of the post 11 are replaced by a single stud 20 and screws 21 and 22 utilized as shown in FIGS. 6 and 7. In this connection, slots 23 are provided on the opposite inner walls of the post 11 for guiding the self-tapping screws 21.

The stud 20 comprises, as a single piece, an arm like head 24 for holding the ends of the rail bases 15 in desired positions and a stud body 25 which is large enough to fill the hollow of the hollow post 11 but leaves gaps which serve as guiding grooves 23 for the self-tapping screws. The upper end of the stud body 25 is formed with a rounded center portion 26 and the border portion of the stud 20 between the arm head 24 and the rounded center portion 26 is formed as a reduced portion 27. At the time the stud body 25 is driven into the post 11 with a hammer, the rounded center portion 26 serves to separate the opposite walls of the body 25 to thereby urge then against the opposite inner walls of the post 11. The reduced portion 27 is provided mainly so that rail heads 25 can be bent to accommodate variations in angle between the rail base 15 and the post 11 as frequently becomes necessary where the present invention is applied to construct a handrail for a stairway. Another effect of the portion 27 is to prevent the arm heads 24 from becoming angularly misaligned when the stud body 25 is driven too far into the post 11 since bending of the arm head 24 is reduced by stretching of the portion 27.

Among the four holes provided in the arm head 24, holes 28 for the tapping screws 21 are not threaded while the other holes 29 for the set screws 22 are.

Where the stud 20 having the special construction described above is to be mass-produced from aluminum or aluminum alloy, it is recommendable to first produce an elongated rod material having a cross section like the stud 20 by extrusion-molding and then to cut the rod material into lengths corresponding to the internal size of the posts 11.

The grooves 23 provided on the inner surfaces of the post 11 for guiding the self-tapping screws can be easily formed when the post 11 is extrusion-molded, and therefore the provision of the grooves 23 does substantially not affect the production cost of the post.

In assembling the joint, the stud body 25 is first inserted in the end of the post 11 and tapped lightly with a hammer until the lower face of the arm head 24 makes contact with the upper face of the post 11. The arm head 24 has a form suitable to smoothly slide between a pair of hooked protrusions 30 provided in opposing orientation on the sides of the rail base 15. The end portion of the rail bases 15 can be fitted onto the arm heads 24 either before or after the stud body 25 is inserted into the post 11. The self-tapping screws 21 are then screwed through the holes 28 into the guide grooves 23 in the inner walls of the post 11. The screw threads of the self-tapping screws 21 bite into both the surfaces of the grooves 23 and the surfaces of the stud body 25.

When the distance between adjacent posts differs from the length of the rail base 15, the difference can be compensated for by regulating the insertion depth of the arm head 24 into the end of the rail base 15. After regulation of the insertion depth, the set screws 22 are tightened to fix the rail bases 15 to the stud 20 and thus the rail bases 15 are jointed through the stud 20 to the post 11. In this case, however, the set screws are not absolutely necessary and may be omitted as in the conventional joint shown in FIG. 2. Finally, the rail 12 is resiliently fitted onto the rail base 15 to complete the assembly of the railing as shown in FIG. 7.

FIGS. 8 and 9 show a modification wherein the stud does not directly hold the rail bases 15 in the desired positions as in the first described embodiment but holds them indirectly. In this case, the stud 20' is of very simple form having no portion between the stud head 24' and the stud body 25' corresponding to the reduced portion 27 in the previous embodiment. In this embodiment, the stud 20' is tapered throughout its vertical length so that it has a wedge like shape. It should be understood that a stud tapered only in the lower half may also be used. The wedge like head 24' holds the rail bases 15 in the desired positions through a pair of L-shaped hangers 31.

The horizontal portion 39 of the L-shaped hangers 31 is slid into the rail base 15 as in the previously described embodiment and arm head 24 and the vertical portion 33 of the hangers 31 are inserted into the post 11. Axially extending shoulders 34 provided in the four corners of the post 11 are used to center the vertical portion 33 of the hangers 31 so that the center of the rail bases 15 align with the center of the post 11.

The vertical portions 33 of the hangers 31 are inserted into the end of the post 11 and the stud 20' is driven into the space between the vertical portions 33 to establish the positional relationship of the parts shown in FIG. 9. When the joint is assembled in this manner the rail bases 15 on both sides of the post 11 will remain reliably fixed to the post as long as the stud 20' does not escape upwardly. The stud 20' is reliably fixed in the post 11 by means of the self-tapping screws 21 screwed between the tapping screw guide grooves 35 provided in the opposite side surfaces of the stud and corresponding guide grooves 23 in the opposite inner walls of the post. Finally, the hangers 31 are fixed to the rail bases 15 by the set screws 22 and the rail 12 is resiliently mounted thereon as in the previous embodiment.

The hereinbefore described embodiments which are used when the lateral member (the rail base) does not pass over or under the end of the post are mere examples and those skilled in the art will easily be able to make various modifications thereof using studs which function to hold the lateral members in the desired positions and are of such size that they can be inserted into the hollow of the posts by light hammering. The manner in which the self-tapping screws are used for fixing the stud to the hollow post is arbitrary, provided that the tapping screws are inserted in parallel with and between the stud and the hollow post.

FIGS. 10 to 12 show embodiments used where the lateral members pass over and under the end of the hollow post. This jointing method is used to connect the end faces of vertical bars 14 to the rail 12 and the bottom rail 13 in FIG. 1. Since the joint between the rail 12 and the bar 14 is the same as that between the bottom rail 13 and the bar 14, only the joint between the rail base 15 and the vertical bar 14 will be described. Since the rail base 15 rides on the end face of the vertical bar 14, a hole 36 having the same size and shape as the cross-sectional size and shape of the interior of the bar 14 is provided in the rail base 15 in the same position as that of the bar 14 so that the peripheral portion of the hole 36 rides on the periphery of the bar 14. Because of this relationship, it is possible to pressingly insert the stud 20'' from the upper side of the rail base 15 through the hole 36 into the bar 14. The fit of body 25'' of the stud 20'' into the interior of the bar 14 is snug to the extent that the body can be inserted thereinto by light hammering. The head 24'' of the stud 20'' has grooves 37 on the opposite surfaces thereof for insertion of the self-tapping screws 21 and has shoulders 24'' suitable to press the periphery of the hole 36 onto the periphery of the bar 14.

Axial self-tapping screw guide grooves 35' are provided in the stud 20'' throughout the length thereof at positions which fall at diagonally opposing corners of the bar 14 as shown in FIG. 11. Parallel protrusions 38 are provided at the diagonally opposing corners of the bar 24 and partially define guide grooves. When the self-tapping screws 21 are inserted into the opposing guide grooves, the screw threads of the tapping screws bite into both sides of each groove to thereby engage the stud with the corners of the bar 14. That is, the tapping screws 21 connect the stud 20'' to the bar 14 and the head 24'' of the stud 20'' firmly holds the rail base 15 on the top end of the bar 14. The stud 20'' may be made by the die-casting method. Since the bar 14 is produced by extrusion-molding, it is easy to provide the protrusions 38 in the corners of the bar 14. However, a bar having no such protrusions can be used as the bar 14 and in this case the tapping screws bite into the inner wall of the bar.

In the present invention, the use of the self-tapping screws to fix the stud and the hollow post is very important and other embodiments using self-tapping screws will now be described in detail with reference to FIGS. 13 to 17. Although, in each of FIGS. 13 to 17, cross sectional views of the vertical bar 14 and the stud 20'' are shown, it should be understood that various combinations of hollow posts or tubes and studs other than the bar 14 and the stud 20'' can be jointed in the same manner according to the present invention.

FIG. 13 shows an embodiment in which the parallel protrusions 38 on the inner wall of the bar 14 which partially define a guide groove for the self-tapping screw intrude into the guide groove 35' formed in the stud 20''. This construction is effective to prevent the protrusions 38 from opening laterally when the screw threads of the self-tapping screw bite into the protrusions 38.

FIG. 14 shows another embodiment in which the bar 14 is a circular post.

FIG. 15 shows another embodiment in which the parallel protrusions 38 are provided on all four inner walls of the post 14. In this construction, the stud 20'' does not fit snugly against the inner walls of the post 14. However, since the stud 20'' is not permitted to move in directions other than the axial direction of the post and is inserted in the axial direction by light hammering, a firm jointing is achieved.

FIGS. 16 and 17 show further embodiments in which no selftapping screw guide groove is provided beforehand in the hollow post or in the stud. In the construction shown in FIG. 16, guide grooves are provided by inserting the stud 20" into the post 14, hitting sharp-pointed rods (not shown) into gaps between the stud 20" and the inner walls of the post 14 to widen the gap and then extracting the rod.

FIG. 17 shows a still further embodiment in which a hole 40 whose diameter is slightly smaller than the outer diameter of the self-tapping screw is formed between the stud and the post wall by any suitable boring machine after the stud 20" is inserted.

Methods, such as those shown in FIGS. 16 and 17, for providing the self-tapping screw guide grooves during the assembly of the railing can be applied to all of the preceding embodiments. Therefore, it is not essential to pre-form the guide grooves in the stud or the post walls.

As for the self-tapping screw suitable for use in the present invention, any type of screw such as those shown in FIGS. 18 and 19 or even a simple twisted mail etc. can be employed, provided that it rotates as it is driven with a hammer. Since the screw is driven in the axial direction of the post, the head portion thereof does not protrude from the side face of the post. Further, as the screw does not require a nut the good appearance of the joint is not marred. The assembling work consists merely of the operation of inserting the stud into the post and the operation of driving the self-tapping screws into the gaps between the stud and the post. Most importantly the strength of the joint is not lowered by a combination of mass-produced parts which happens, because of the inherent variation in the size of such parts, to result in a relatively loose fit prior to the insertion of the self-tapping screws. This is a very important advantage over the conventional joint using a wedge only. Further, in the present invention, the self-tapping screws driven into the gaps between the stud and the post walls tend to increase the contact pressure therebetween and this state is maintained by the threads of the screws.

What is claimed is:

1. A method of jointing a lateral member and one end of a hollow post comprising the steps of pressing the stud body portion of a stud comprising a head portion for holding the lateral member in a desired position and a stud body portion of a size and shape to fit substantially snugly against the inner walls of the hollow post into the end of the hollow post and driving at least one self-tapping screw into and along at least one gap between the stud and the inner wall of the hollow post, thereby causing the screw threads of the self-tapping screw to bite into the stud and the inner wall of the hollow post.

2. A method as set forth in claim 1 wherein a sharp-pointed rod is driven into the gap prior to the driving of the self-tapping screw and is thereafter extracted to thereby widen the gap and provide a guide for the self-tapping screw.

3. A method as set forth in claim 1, wherein, prior to the driving of the self-tapping screw, a hole having diameter slightly smaller than the outer diameter of the self-tapping screw is bored in the position at which the self-tapping screw is to be inserted to provide a guide hole for the self-tapping screw.

* * * * *